US005614889A

United States Patent [19]
Kim

[11] Patent Number: 5,614,889
[45] Date of Patent: Mar. 25, 1997

[54] APPARATUS AND METHODS FOR COUPLING A CASE OF AN ELECTRIC APPLIANCE TO AN EXTERNAL GROUND AND FOR DETECTING LEAKAGE CURRENT

[76] Inventor: Jung M. Kim, #548-1, Ojung-dong, Ojung-ku, Boochun-shi, Kyungki-do, Rep. of Korea

[21] Appl. No.: 422,382

[22] Filed: Apr. 13, 1995

[30] Foreign Application Priority Data

| Apr. 14, 1994 | [KR] | Rep. of Korea | 1994-7734 |
| Jul. 29, 1994 | [KR] | Rep. of Korea | 1994-19148 |
| Jul. 29, 1994 | [KR] | Rep. of Korea | 1994-19149 |
| Jul. 29, 1994 | [KR] | Rep. of Korea | 1994-19150 |
| Sep. 24, 1994 | [KR] | Rep. of Korea | 1994-24610 |

[51] Int. Cl.$^6$ ............................................. G08B 21/00
[52] U.S. Cl. ........................... 340/649; 340/650; 340/651
[58] Field of Search ................................. 340/649, 650, 340/651, 652

[56] References Cited

U.S. PATENT DOCUMENTS

| 4,415,944 | 11/1983 | Walker | 340/650 |
| 4,506,260 | 3/1985 | Woodruff | 340/651 |
| 4,882,522 | 11/1989 | Brown | 361/86 |
| 5,065,104 | 11/1991 | Kusko et al. | 340/650 |
| 5,224,006 | 6/1993 | MacKenzie et al. | 361/45 |
| 5,311,138 | 5/1994 | Ott et al. | 340/650 |
| 5,398,149 | 3/1995 | Weil | 361/50 |

*Primary Examiner*—Jeffery Hofsass
*Assistant Examiner*—Timothy Edwards, Jr.
*Attorney, Agent, or Firm*—Skjerven, Morrill, MacPherson, Franklin & Friel; Michael Shenker

[57] ABSTRACT

The apparatus for automatically coupling an internal ground of an electric appliance to an external ground, comprises first and second AC power lines for supplying an AC input to a load; a neutral ground generating circuit for combining the first and the second AC power lines to produce a neutral ground point; a first detection circuit for detecting a current flow from the first AC power line to the internal ground to generate a first current detection signal; a second detection circuit for detecting a current flow from the second AC power line to the internal ground to generate a second current detection signal; and a ground coupling circuit for connecting, in response to the second current detection signal, the first AC power line as the external ground to the internal ground; for connecting in response to the first current detection signal, the second AC power line as the external ground to the internal ground; and for connecting the neutral ground point as the external ground to the internal ground when the first and the second current detection signals are absent.

14 Claims, 7 Drawing Sheets

APPARATUS AND METHODS FOR COUPLING A CASE OF AN ELECTRIC APPLIANCE TO AN EXTERNAL GROUND AND FOR DETECTING LEAKAGE CURRENT

FIELD OF THE INVENTION

The present invention relates to an apparatus for grounding an electric home appliance; and, more particularly, to an apparatus for automatically coupling the internal ground of the electric appliance to the external ground, thereby effectively preventing the user from getting electrically shocked.

DESCRIPTION OF THE PRIOR ART

In electric home appliances such as a washing machine, a microwave oven and a refrigerator, employing an AC power source, a case of the electric home appliance is typically used for an electrical ground.

Figure 1A:
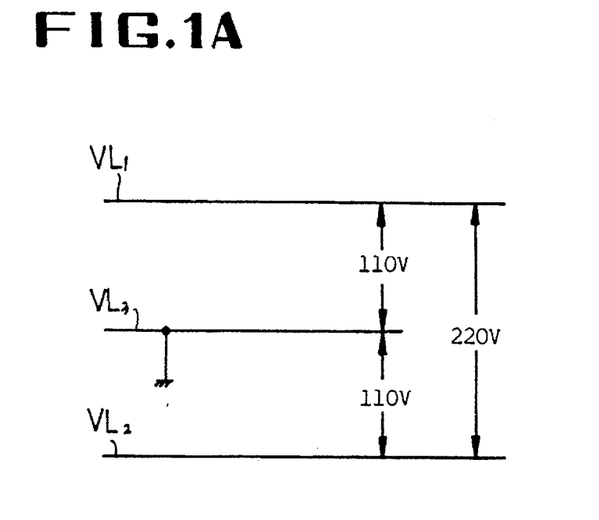
FIG. 1 is a schematic diagram showing AC power sources.

Referring to FIG. 1, an AC power source applied to the home includes various types of sources. A single-phase three-line system, as is shown in FIG. 1a, includes three power lines VL1, VL2 and VL3, wherein the voltage drop across the power lines VL1 and VL2 is 220V and the voltage drop across the power lines VL1 and VL3 or VL2 and VL3 is 110V. In that case, when the neutral point is detected, the voltage at the neutral point is identical to that of the ground line VL3. Therefore, the case of the appliance can be connected to the neutral point and this connection provide a good grounding effect.

Figure 1B:
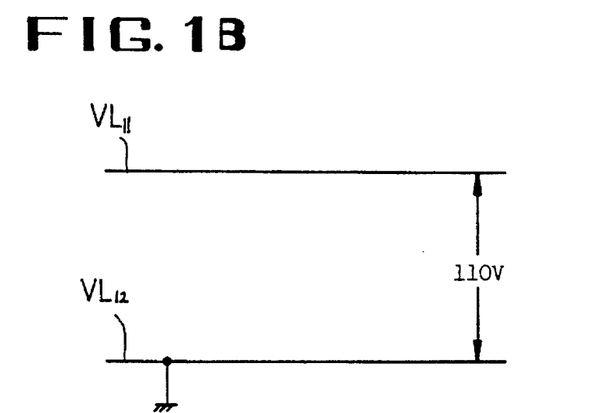
Figure 1C:
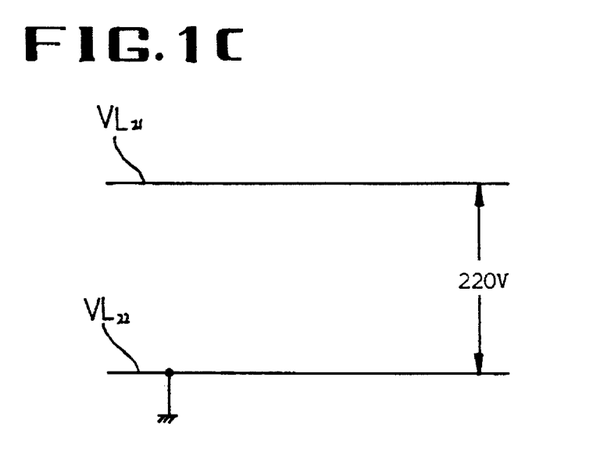

In a single-phase two-line system shown in FIGS. 1b and 1c, one of the power lines VL11 and VL12, or VL21 and VL22 is coupled to the external ground and the voltage drop across the power lines VL11 and VL12, or VL21 and VL22 is 110V or 220V. The case of the appliance can then be connected to the neutral point and this connection provide a good grounding effect.

Therefore, it is advised by the manufacturer that, at the installation of the appliance, the case should be connected to an external ground, a conductive material embedded in the ground, e.g., a water pipe, or the grounded power line.

However, when the grounding is to be made manually by the user according to a mechanical connection, the task may become excessively or unduly complex. Furthermore, such a complex task of adjustment may confuse an ordinary user who may be unfamiliar with the mechanics of grounding and may be frustrated with the difficult burden of the grounding operation. Therefore, appliances have been used without the external ground and, as a result, users have often been the electrically shocked.

On the other hand, electric appliances such as a television, a monitor for use in a computer, or a microwave oven, generate a large amount of electrical waves which may interfere with the operation of other electrical devices and exert a bad influence upon the human body.

SUMMARY OF THE INVENTION

It is, therefore, an object of the present invention to provide an apparatus for automatically connecting the internal ground for the appliance to the external ground.

Another object of the present invention is to provide an apparatus for effectively detecting a leakage current to protect the appliance from the leakage current.

Another object of the present invention is to provide a power apparatus for use in an electric home appliance including a circuit for automatically connecting the internal ground for the appliance and the external ground and a circuit for effectively detecting a leakage current to protect the appliance from the leakage current.

In accordance with one aspect of the invention, there is provided an apparatus for automatically coupling an internal ground of an electric appliance to an external ground, which comprises: first and second AC power lines for supplying an AC input to a load; neutral ground generating means for combining the first and the second AC power lines to produce a neutral ground point; first detection means for detecting a current flow from the first AC power line to the internal ground to generate a first current detection signal; second detection means for detecting a current flow from the second AC power line to the internal ground to generate a second current detection signal; and ground coupling means, in response to the second current detection signal, for connecting the first AC power line as the external ground to the internal ground; in response to the first current detection signal for connecting the second AC power line as the external ground to the internal ground; and for connecting the neutral ground point as the external ground to the internal ground when the first and the second current detection signal are absent.

BRIEF DESCRIPTION OF THE DRAWINGS

The foregoing and other objects, features and advantages of the present invention will become apparent from the following detailed description of preferred embodiments of the invention, reference being made to the accompanying drawings, in which like reference numerals indicate like parts.

DETAILED DESCRIPTION OF THE PREFERRED EMBODIMENTS

Figure 2:
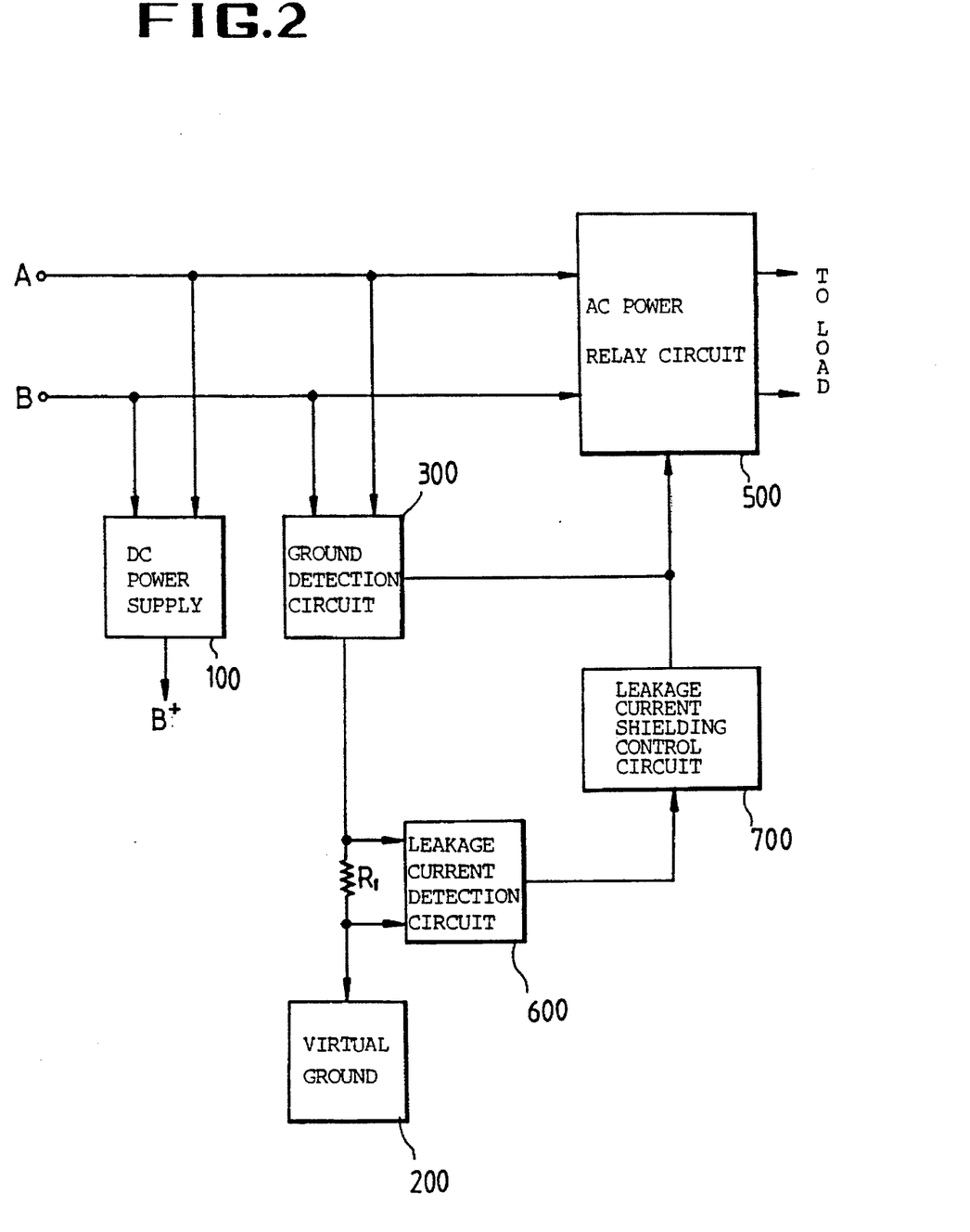
FIG. 2 is a schematic block diagram illustrating a power circuit of an electric home appliance in accordance with the present invention.

FIG. 2 illustrates a schematic block diagram of a power circuit in accordance with the present invention. As shown, the power circuit includes a DC power supply 100, a virtual ground 200, e.g., an electrically conductive case of the appliance, a ground detection circuit 300, a resistor R1 connected between the ground detection circuit 300 and the virtual ground 200, an AC power relay circuit 500, a leakage current detection circuit 600 and a leakage current shielding control circuit 700.

The DC power supply 100 serves to convert the AC input from the power lines A and B into a DC operating power B+ which is coupled to the ground detection circuit 300, the AC power relay circuit 500, and the leakage current detection circuit 600.

The ground detection circuit 300 is connected to the AC power lines A and B and serves to detect an external ground on the basis of detection of a current from the power lines A and B to the virtual ground 200 to connect the detected external ground with the virtual ground 200.

The AC power relay circuit 500 serves to provide the AC input from the AC power lines A and B to the load of the electric appliance.

The resistor R1 is used for sensing the current flowing to the virtual ground 200. The leakage current detection circuit 600 serves to detect a voltage drop across the resistor R1 to generate a leakage current detection signal.

The leakage current shielding control circuit 700 is responsive to the leakage current detection signal and serves to generate a control signal for use in preventing the AC input from being provided to the load, thereby blocking the AC input to be applied via the AC power relay circuit 500 to the appliance 400.

Figure 3:
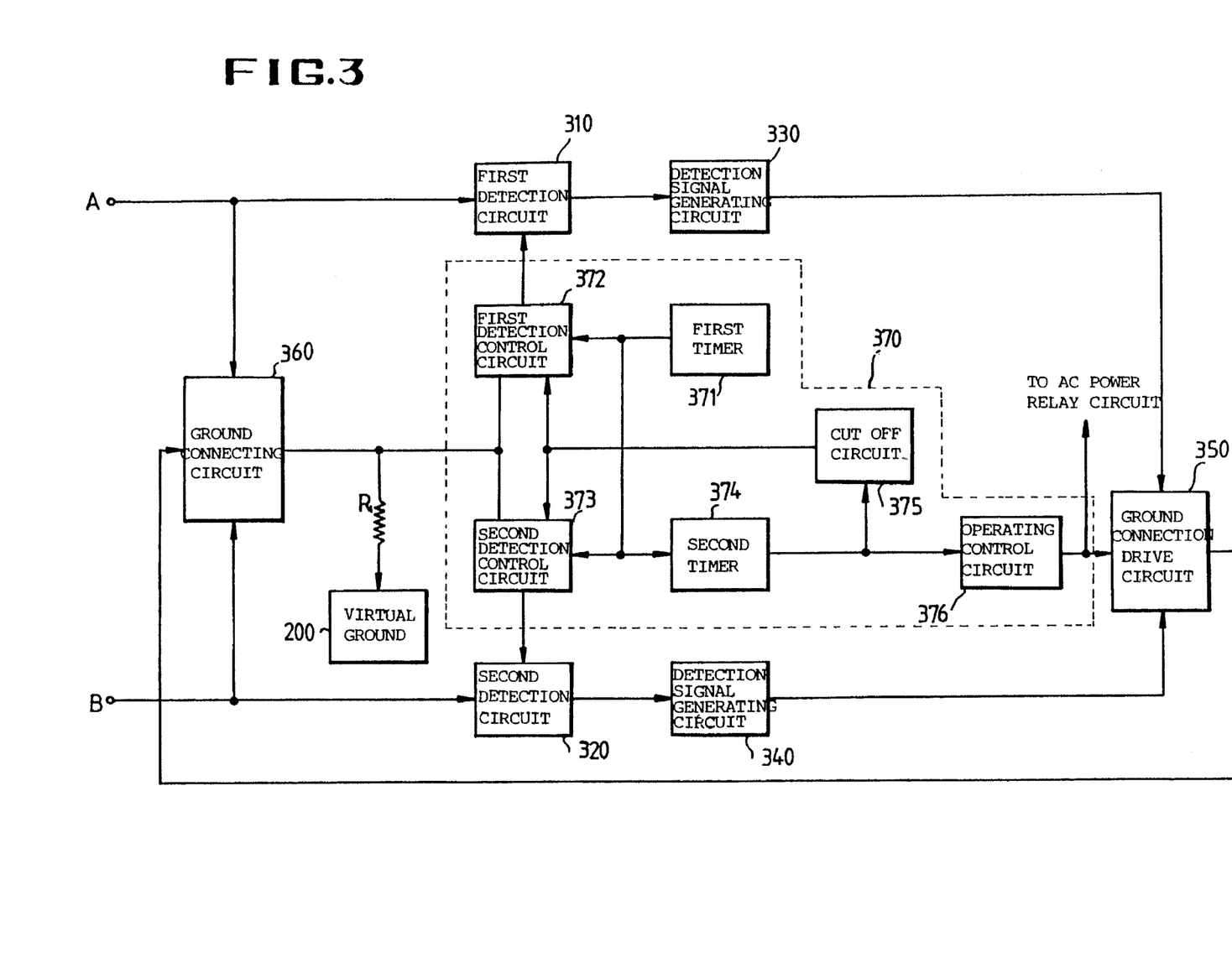
FIG. 3 is a detailed block diagram depicting the ground detection circuit shown in FIG. 1.

Referring to FIG. 3, there is shown a detailed block diagram of the ground detection circuit 300 shown in FIG. 2. The ground detection circuit 300 includes first and second detection circuits 310 and 320, detection signal generating circuits 330 and 340, a ground connection drive circuit 350, a ground connecting circuit 360, a ground detection control circuits 370.

The first and the second detection circuit 310 and 320 are connected to the source lines A and B and serve to determine whether or not the source line A or B is connected to the external ground.

The detection signal generating circuits 330 and 340 receive the outputs from the first and second detection circuits 310 and 320, respectively, and shape the outputs in order to generate first and second detection signals, respectively.

The ground connection drive circuit 350 serves to combine the first and second detection signals in order to generate a drive signal for use in a connection of the AC power line A or B to the virtual ground 200.

The ground connecting circuit 360 is responsive to the drive signal and serves to selectively couple the AC power line A or B to the virtual ground 200.

The ground detection control circuit 370 includes a first timer 371, a first detection control circuit 372, a second detection control circuit 373, a second timer 374, a cut-off circuit 375 and an operating control circuit 376. The ground detection control circuit 370 serves to sequentially drive the first and the second detection circuits 310 and 320 and, when the virtual ground has been connected to the AC power lines A or B, to stop the operation of the first and the second detection circuits 310 and 320; and to provide the DC operating power to the ground connection drive circuit 350 and the AC power relay circuit 500.

The first timer 371 serves to generate a first detection drive signal during a predetermined time period at initial state of the supplied power.

The first detection control circuit 372 receives the first detection drive signal to drive the first detection circuit 310.

The second detection control circuit 373 serves to drive the second detection circuit 320, when the first detection drive signal is terminated.

The second timer 374 in response to the termination of the first detection drive signal serves to count a predetermined time period in order to generate a second signal.

The cut-off circuit 375 is responsive to the control signal to block the supply of the DC operating power to the first control circuit 372 and the second control circuit 373.

The operating control circuit 376, responsive to the control signal, serves to provide the operating power to the ground connection drive circuit 350 and the AC power relay circuit 500.

The AC power is coupled to the power supply 100 in which the AC power is filtered by two filters having the same impedance and rectified into a DC operating power.

When the DC operating power is coupled to the ground detection circuit 300, the DC operating power is then coupled to the first and second detection control circuit 372 and 373. The first timer circuit 371 generates a first detection drive signal having a predetermined time interval which is coupled to the first and the second detection control circuits 372 and 373. The first detection control circuit 372, in response to the first detection drive signal, serves to generate a first control signal which is coupled to the first detection circuit 310. The first detection circuit 310 serves to detect a current flowing from the power line A to the virtual ground 200 and, when the current is not detected, to generate a current detection signal.

When the predetermined time interval has lapsed, the second timer 374 is then actuated, and the second detection control circuit 373 serves to generate a second control signal.

The second control signal is coupled to the second detection circuit 320 which is responsive thereto and serves to detect a current flowing from the power line B to the virtual ground 200. When the current is not detected, the second detection circuit 320 generates a second current detection signal.

When the predetermined time interval is lapsed, the second timer 374 generate a control signal which is coupled to the blocking circuit 375 and the operating control circuit 376. The blocking circuit 375, in response to the control signal serves to block the supply of the DC power to the first and the second detection control circuits 372 and 373.

On the other hand, the drive control circuit 376, in response to the control signal, serves to provide the DC power to the AC power relay circuit 500 and the ground connection drive circuit 350. The AC power relay circuit 500, in response to the control signal, serves to couple the power lines A and B to the load in order to operate the appliance.

Further, the first and the second current detection signals are shaped by the detection signal generating circuits 330 and 340, respectively, and coupled to the ground connection drive circuit 350 which serves to control the ground selection connection circuit 360 to connect the AC power lines A or B to the virtual ground 200.

That is, when the first detection circuit 310 detects a current flowing from the power line A to the virtual ground 200 and the second detection circuit 320 does not detect a current flowing from the power line B to the virtual ground 200, the power line B is coupled to the virtual ground 200.

When the first detection circuit 310 does not detect a current flowing from the power line A to the virtual ground 200 and the second detection circuit 320 detects a current flowing from the power line A to the virtual ground 200, the power line A is coupled to the virtual ground 200.

Figure 4:
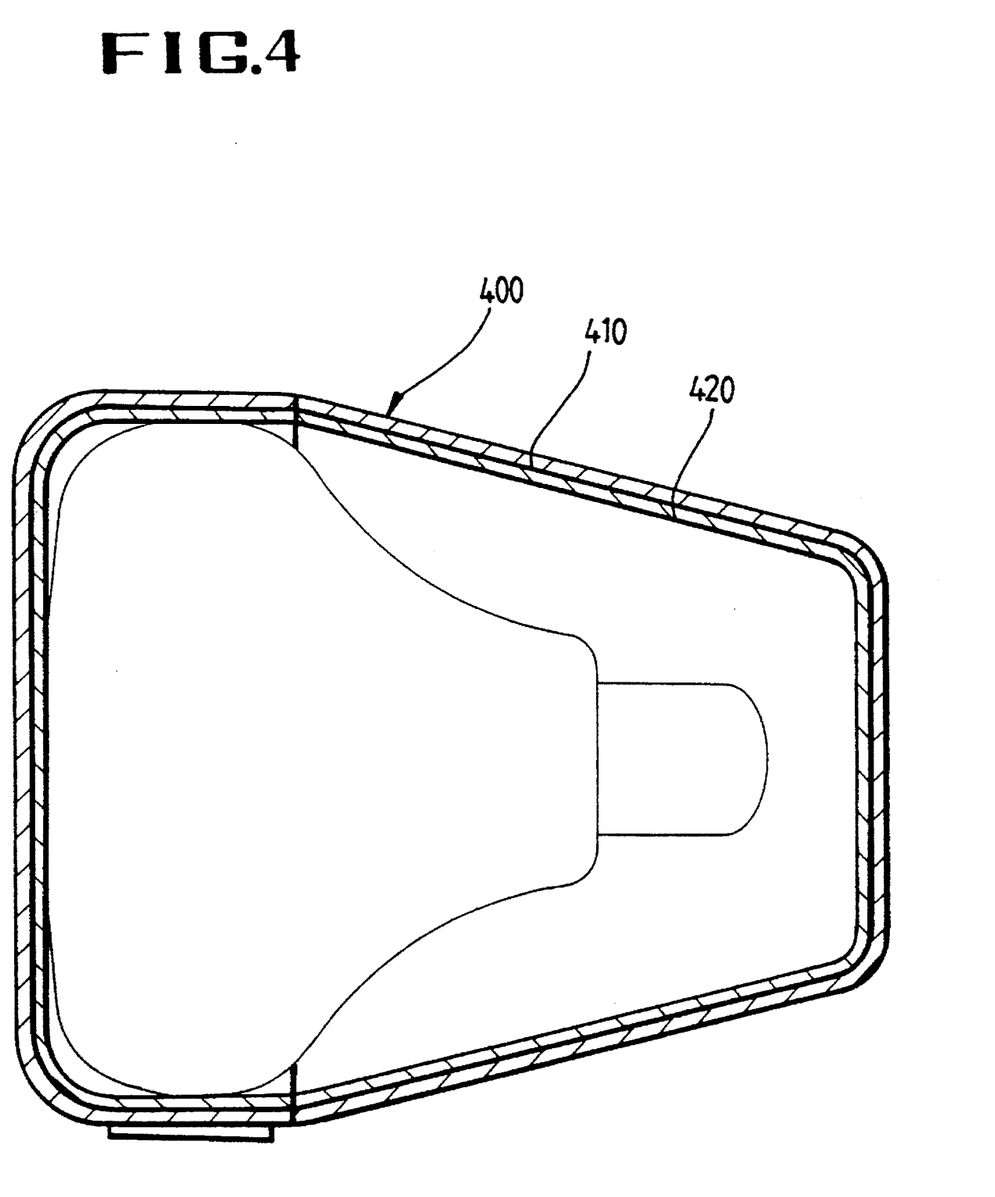
FIG. 4 is a schematic diagram, illustrating the case of the electric home appliance in accordance with the present invention.

As can be seen from the above, it is readily appreciated that, by using the ground detection circuit 300, the leakage current is effectively detected and grounded. For example, when the case of the appliance is made of an electrically conductive material, the case is coupled to the virtual ground as a shield. When the case is made of electrically nonconductive material, e.g. plastic 400 and 420 shown in FIG. 4, the electrically conductive material layer, e.g., metal or carbon 410, is deposited on the case and is coupled to the virtual ground 200.

When a leakage current flows across the appliance, the current flowing through the resistor R1 is increased and the voltage drop across the resistor R1 is then increased. The leakage current detection circuit 600 detects the voltage drop across the resistor R1 to generate a leakage current detection signal which is coupled to the leakage current shielding control circuit 700. The leakage current shielding control circuit 700 serves to provide a power blocking signal to the power supplying circuit 500 in order to prevent the AC power from being provided to the load of the appliance.

Figure 5:
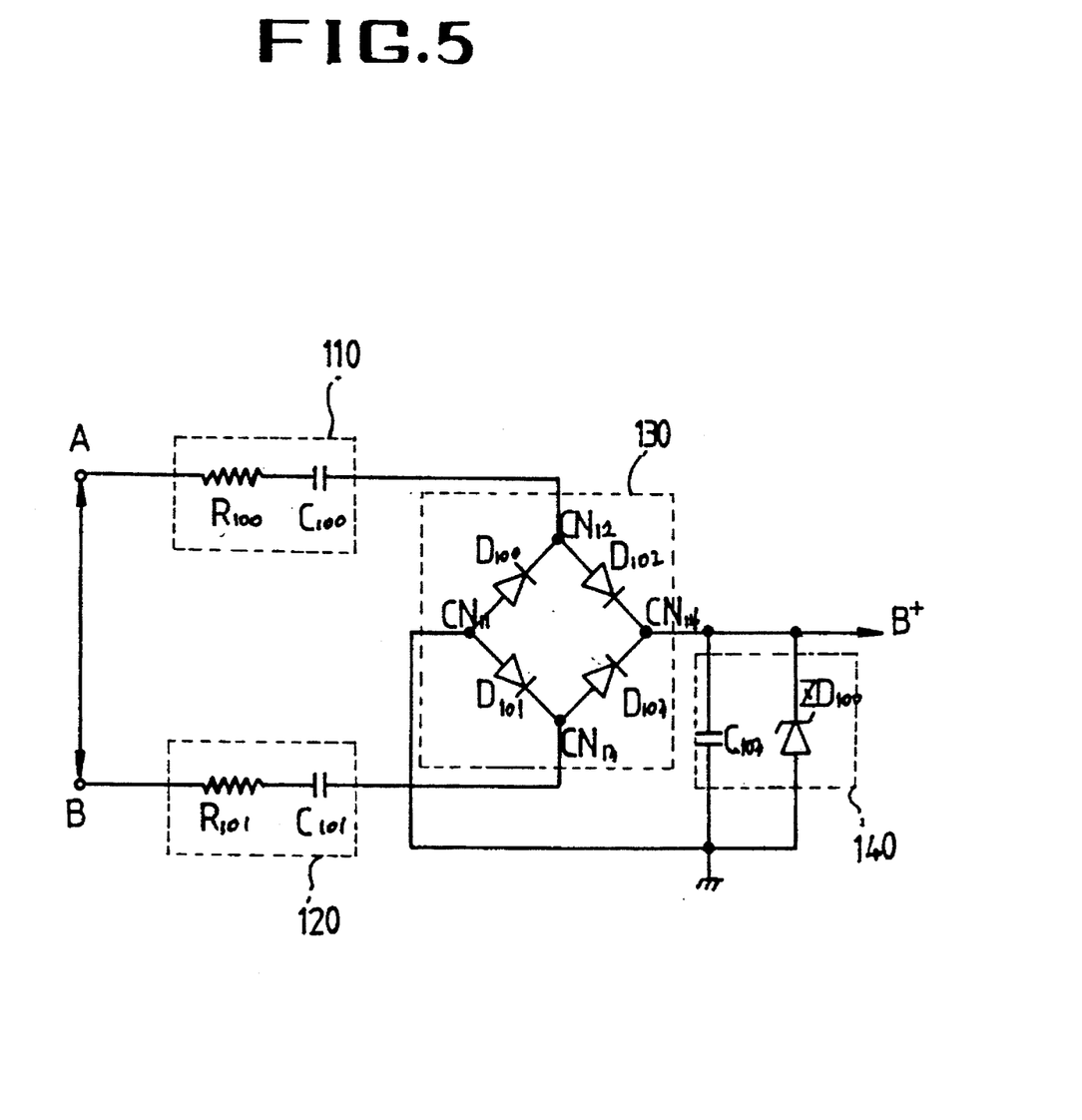
FIG. 5 is a circuit diagram disclosing the DC power supply shown in FIG. 1.

Referring to FIG. 5, the power supply 100 comprises filters 110 and 120, a bridge rectifier 130, and a smoothing circuit 140.

An AC input on lines A and B is filtered by the filters and 120 which are used to impede or prevent high frequency ripples from showing up on the AC input lines A and B. The voltage of the AC input power is typically 110 volts or 220 volts. The filter 110 include a serial connection of a resistor R100 and a capacitor C100, and the filter 120 has a serial connection of a resistor 101 and a capacitor 121, wherein the resistance of the resistor 100 is identical to that of the resistor 101 and the capacitance of the capacitor 100 is also identical to that of the capacitor C101.

The filtered AC input is rectified through the bridge rectifier 130 and supplied to the smoothing circuit 140. The bridge rectifier 130 includes four diodes D100, D101, D102 and D103 and the input ports CN12 and CN13 thereof are coupled to the outputs of the filters 110 and 120, respectively. And the output ports CN11 and CN14 are coupled to the smoothing circuit 140.

The smoothing circuit 140 includes a storage capacitor C103 and a zener diode ZD100 which are connected in parallel between an output line and the ground. The storage capacitor C103 may be a large electrolytic bulk storage capacitor used to filter and store the DC output voltage and the zener diode ZD 100 is used to limit the output DC voltage B at the output line so that the output DC voltage B is a constant voltage.

As may be seen from the above, since the resistance of the resistor 100 is identical to that of the resistor 101 and tile capacitance of the capacitor 100 is also identical to that of the capacitor C101, the voltage drop between the ground and the AC input line A or B becomes a half of the voltage drop across the AC input lines A and B. That is, when the voltage drop between the AC input lines A and B is 220V, the voltage drop between the ground and the AC line A or B is 110V. When the voltage drop between the AC input lines A and B is 110, the voltage drop between the ground and the AC line A or B is 55V. Therefore, it is easy for the ground detection circuit 300 to exactly detect a current flowing from the AC input lines A and B to the virtual ground.

Figure 6:
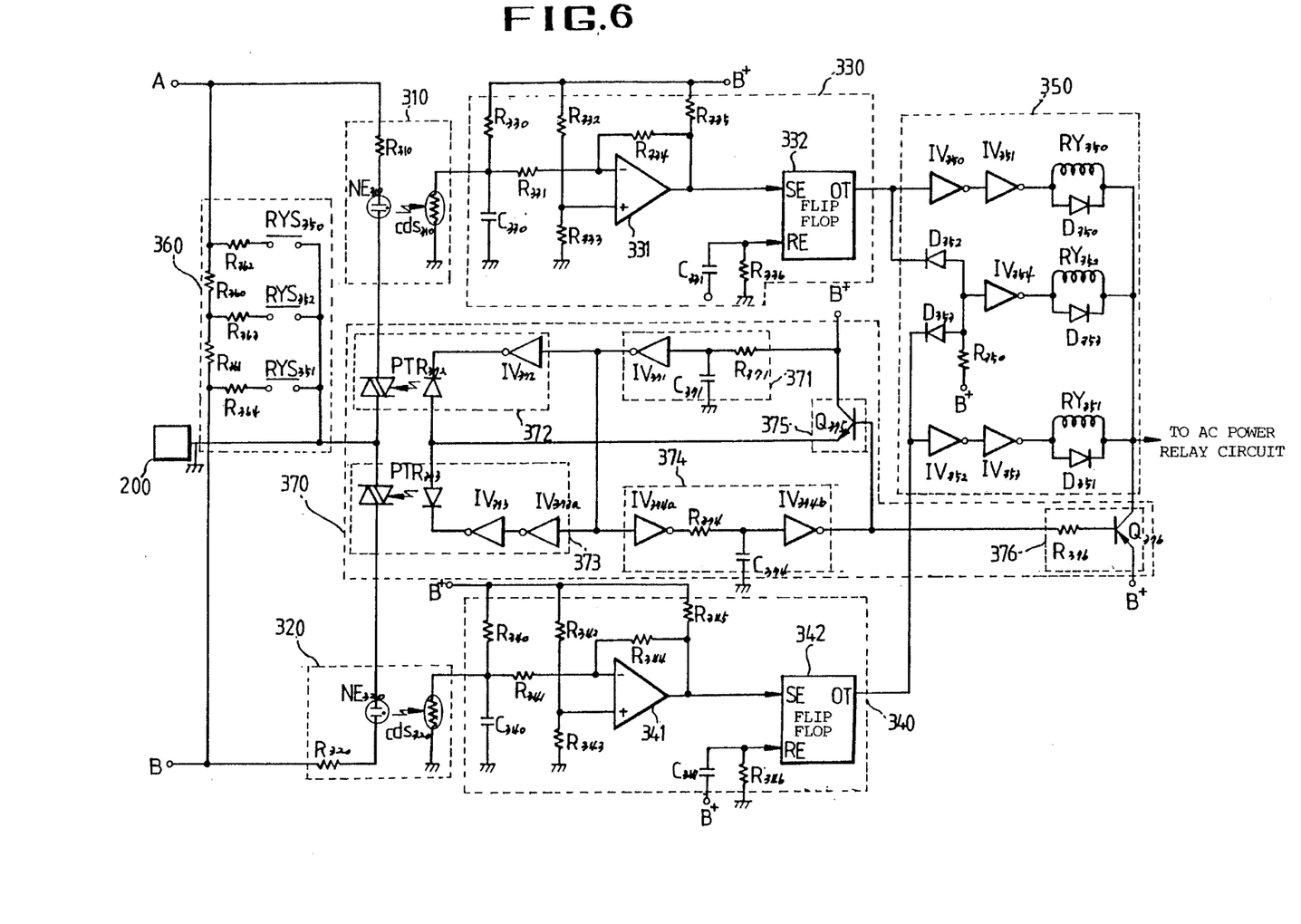
FIG. 6 is a circuit diagram illustrating the ground detection circuit shown in FIG. 3.

Referring to FIG. 6, there is shown a detailed circuit diagram of the ground detection circuit 300 depicted in FIG. 3.

The first detection circuit 310 includes a resistor R310 and a neon tube NE310 which are serially connected via a triac PTR372 between the power line A and the virtual ground 200. The second detection circuit 320 has a resistor R320 and a neon tube NE320 which are serially connected via triac PTR between the power line B and the virtual ground 200.

When the current flows through the neon tubes NE310 and NE320, the neon tubes NE310 and NE 320 serve to convert the current to an optical signal corresponding to the current.

The detection signal generating circuits 330 and 340 include comparators 331 and 341 and flip flops 332 and 342. The inverting inputs of the comparators 331 and 341 are connected via current limit resistors R331 and R341 to parallel connections of the photo conductive elements cds310 and cds320 and the capacitors C330 and C340 while the non-inverting inputs thereof are coupled to predetermined reference voltage sources comprising resistors R332, R333, R342 and R343 which serve to operate as voltage dividers. The predetermined reference voltage may be determined by the system designer in proportion to a property of the photo conductive elements cds 310 and cds 320.

As described above, when the optical signal from the neon tube NE 310 or NE 320 is received, the voltage drop across the parallel connection of the respective capacitor C330 or C340 is decreased and then received on the inverting input of the respective comparator 331 or 341. The DC reference voltage is applied to the non-inverting input of the comparators 331 and 341. This fixed reference voltage is compared, by means of the comparator 331 or 341, with the decreased detected voltage drop across the parallel connection of the photo conductive element cds310 or cds320 and the capacitor C330 or C340 so that the comparator 331 or 341 generates a logic high level signal which is coupled to a set input of the respective flip flop 332 or 342. Therefore, the flip flop 332 or 342, in response to the logic high level signal, generates a current detection signal having a logic high level which is coupled to the ground connection drive circuit 350.

The ground connection drive circuit 350 includes three relay circuits RY350, RY351, and RY352. The output from the detection signal generating circuit 330 is coupled via a series connection of two inverters IV350 and IV351 to the relay RY350 and coupled via an inversely coupled diode D352 and an inverter IV354 to the relay RY352. The output from the detection signal generating circuit 340 is coupled via a series connection of two inverters IV352 and IV353 to the relay RY351 and coupled via an inversely coupled diode D353 and an inverter IVB54 to the relay RY352.

The ground connecting circuit 360 includes three switches RYS350, RY5351 and RYS352 actuated by the three relay circuits RY350, RY351, and RY352, and resistors R360, R361, R362, R363 and R364. When the switch RYS350 is turned on by the relay RY350, the AC power line A is coupled via resistors R362 and R1 to the virtual ground 200 and the AC power line B is connected via resistors R360, R361, R362 and R1 to the virtual ground 200. When the switch RYS351 is turned on by the relay RY351, the AC power line A is connected via resistors R360, R361, R364 and R1 to the virtual ground 200 and the AC power line B is coupled via resistors R364 and R1 to the virtual ground 200. When the switch RYS352 is turned on by the relay RY352, the AC power line A is connected via resistors R360, R363 and R1 to the virtual ground 200 and the AC power line B is coupled via resistors R361, R363 and R1 to the virtual ground 200.

The ground connection control circuit 370, as described in FIG. 3, includes the first detection control circuit 372, the first timer 371, the second detection control circuit 373, the second timer 374, the cut-off circuit 375 and operating control circuit 375.

The first timer 371 includes an inverter IV371, a capacitor C371 and a resistor R371. The operating power B is coupled via the resistor R371 to the capacitor The first detection control circuit 372 includes an inverter IV372 and a photocoupler PTR 372. The photocoupler PTR372 serves to selectively couple the first detection circuit 310 via the resistor R1 to the virtual ground 200 in accordance with the output from the inverter IV371. An input to the inverter IV371 is coupled to the IV371 of the first timer 371.

The second detection control circuit 373 includes inverters IV373a and IV373b, and a photocoupler PTR 373. The photocoupler PTR373 serves to selectively couple the second detection circuit 320 via the resistor R1 to the virtual ground 200 in accordance with the output from the inverter IV373b. An input to the invert IV373b is coupled to the inverter IV373a, wherein an input to the inverter IV373a is coupled to the inverter IV371 of the first timer 371.

The second timer 374 includes inverters 374a and 374b, a capacitor C374 and a resistor R374. The input to the inverter IV374a is coupled to the output from the inverter IV371 of the first timer 371 and the output from the inverter IV374a is coupled via the resistor R374 to the capacitor C374. The output from the capacitor C374 is coupled to the input to the inverter 374b, wherein the output from the inverter IV374b is coupled to the cut-off circuit 375 and the operating control circuit 376.

The cut-off circuit 375 includes a NPN transistor Q375, its base is coupled to the output from the inverter IV374b; the emitter is coupled to the photocouplers PTR372 and PTR373; and the collector is coupled to the operating power B.

The operating control circuit includes a PNP transistor Q376, its base is coupled via a current limiting resistor R376 to the output from the inverter IV374b; the emitter is coupled to the operating power B; and the collector is coupled to the relay circuits RY350, RY351 and RY352 of the ground connection drive circuit 350.

The operation of the above configuration of the present invention will be described in detail hereinafter.

When the operating power is coupled to the ground detection circuit 300, the operating power is coupled to the reset signal generators C331, R336, C341 and R346, and the comparators 331 and 341 of the detection signal generating circuits 330 and 340. The operating power is also coupled via resistor R371 to the capacitor C371 of the first timer 371 and directly coupled to the collector of the NPN transistor Q375 of the cut-off circuit 375 and the emitter of the PNP transistor Q376 of the operating control circuit 376.

The reset signal generators C331, R336, C341 and R346 of the detection signal generating circuits 330 and 340 generate the reset signals to the flip flops 332 and 342, respectively. The flip flops 332 and 342 of the detection signal generating circuits 330 and 340 then generate on outputs OT the logic low level signals which are coupled to the ground connection control circuit 350. The operating power is divided by the voltage dividers consisting of the resistors R332 and R333, and R342 and R343. The divided operating powers are coupled to the non-inverting inputs of the comparators 331 and 341, respectively.

While the capacitor C371 is being charged by the operating power, the inverter IV371 generates a logic high level signal which is coupled to the inverters IV372, IV373a and IV374a. The logic low signal from the inverter IV372 is coupled to the photocoupler PTR372, while the logic high level signal from the inverter IV371 is coupled via the inverter IV373a and IV373b to the photocoupler PTR373. The logic low Level signal from the inverter 374a is coupled through the resistor R374 to the capacitor C374. Since the capacitor 374 is not charged, the inverter IV374b generates a logic high level signal which is coupled to the base of the NPN transistor Q375 and the PNP transistor Q376. The NPN transistor Q375 is then turned on and the PNP transistor Q376 is turned off. Therefore, the operating power is coupled via the NPN transistor Q375 to the photocoupler PTR372 which then couples the first detection circuit 310 to the virtual ground 200.

When the AC power line A is coupled to the external ground, the AC input from the line A is identical to that of the virtual ground. Therefore, the neon tube NE310 is not activated and the voltage drop across the photo conductive element Cds 310 is greater than the reference voltage across the resistor R333. As result, the comparator 331 produces a logic low level signal which is coupled to the set input SE of the flip flop 332. The flip flop 332 generates a logic low level signal to the ground connection circuit 350.

When the AC power line A is not coupled no the external ground, the AC input from the line A is greater than that of the virtual ground. Therefore, the neon tube NE310 is activated and the voltage drop across the photo conductive element Cds 310 is smaller than the reference voltage across the resistor R333. As result, the comparator 331 produces a logic high level signal which is coupled to the set input SE of the flip flop 332. The flip flop 332 generates a logic high level signal to the ground connection circuit 350.

On the other hand, when the capacitor C371 has been charged, the inverter IV371 generates a logic low level signal which is coupled to the inverters IV372, IV373a and IV374a. The inverter IV374a then generates a logic high level signal and the charge operation of the capacitor 374 is initiated. While the capacitor 374 is being charged, the logic high level signal form the inverter IV374b is maintained. The logic low signal from the inverter IV371 is coupled via the inverters IV 373b and 373a to the photocoupler PTR373, while the logic high level signal from the inverter IV372 is coupled to the photocoupler PTR372. The operating power is coupled via the NPN transistor Q375 to the photocoupler PTR373 which then couples the second detection circuit 310 to the virtual ground 200.

When the AC power line B is coupled to the external ground, the AC input from the line B is identical to that of the virtual ground 200. Therefore, the neon tube NE320 is not activated and the voltage drop across the photo conductive element Cds320 is greater than the reference voltage across the resistor R343. As result, the comparator 341 produces a logic low level signal which is coupled to the set input SE of the flip flop 342. The flip flop 342 generates a logic low level signal to the ground connection circuit 350.

When the AC power line B is not coupled to the external ground, the AC input from the line B is greater than that of the virtual ground. Therefore, the neon tube NE320 is activated so that the voltage drop across the photo conductive element Cds 320 is smaller than the reference voltage across the resistor R343. As result, the comparator 341 produces a logic high level signal which is coupled to the set input SE of the flip flop 342. The flip flop 342 generates a logic high level signal to the ground connection circuit 350.

As can be seen from the above, it should be appreciated that the detection signal generating circuit 330 serves to generate the ground detection signal, e.g., the logic low level signal when the AC power line A is coupled to the external ground, while the detection signal generating circuit 340 serves to generate the ground detection signal, e.g., the logic low level signal when the AC power line B is coupled to the external ground.

When the capacitor 374 has been charged, the inverter IV374b generates a logic low level signal which is coupled to the base of the transistor Q375 and via the resistor R376 to the transistor Q376. The transistor Q375 is then turned off so that the photocouplers PTR372 and PTR373 are turned off. The transistor Q376 is now turned on and the DC operating power is coupled via the transistor Q376 to the ground connection drive circuit 350.

When the AC power line A, as described above, is coupled to external ground and the detection signal generating circuit 330 generates the ground detection signal, e.g., the logic low level signal which is coupled via the inverters IV350 and IV351 to the relay RY350, the DC operating power B is coupled via the transistor Q376 to the relay RY350. The relay RY350 is then activated so that the AC power line A connected to the external ground is coupled via the resistor 362 and the switch RYS350 to the virtual ground 200. In a same manner, when the AC power line B is coupled to external ground and the detection signal generating circuit 340 generates the ground detection signal, e.g., the logic low level signal which is coupled via the inverters IV352 and IV353 to the relay RY351, the DC operating power B is coupled via the transistor Q376 to the relay RY351. The relay RY351 is then activated so that the AC power line B connected to the external ground is coupled via the resistor 361 and the switch RYS351 to the virtual ground 200.

On the other hand, when the AC power lines A and B are not connected to external ground the detection signal generating circuits 330 and 340 generate the logic high level signals which are coupled to the diode D352 and D353. Therefore, the DC operating power B is coupled to the inverter IV354 and the inverter IV354 then generates a logic low level signal which is coupled to the relay RY352 so that the DC operating power B is coupled via the transistor Q376 to the relay RY352. The relay RY352 is now activated and the AC power lines A and B are coupled via the resistors 360 and 363 and the switch RYS352, and the resistors 361 and 363 and the switch RYS352 to the virtual ground 200, respectively.

From the foregoing, it should be apparent that the time interval of the first detection control signal is determined by a time contant of the resistor R371 and the capacitor C371.

Figure 7:
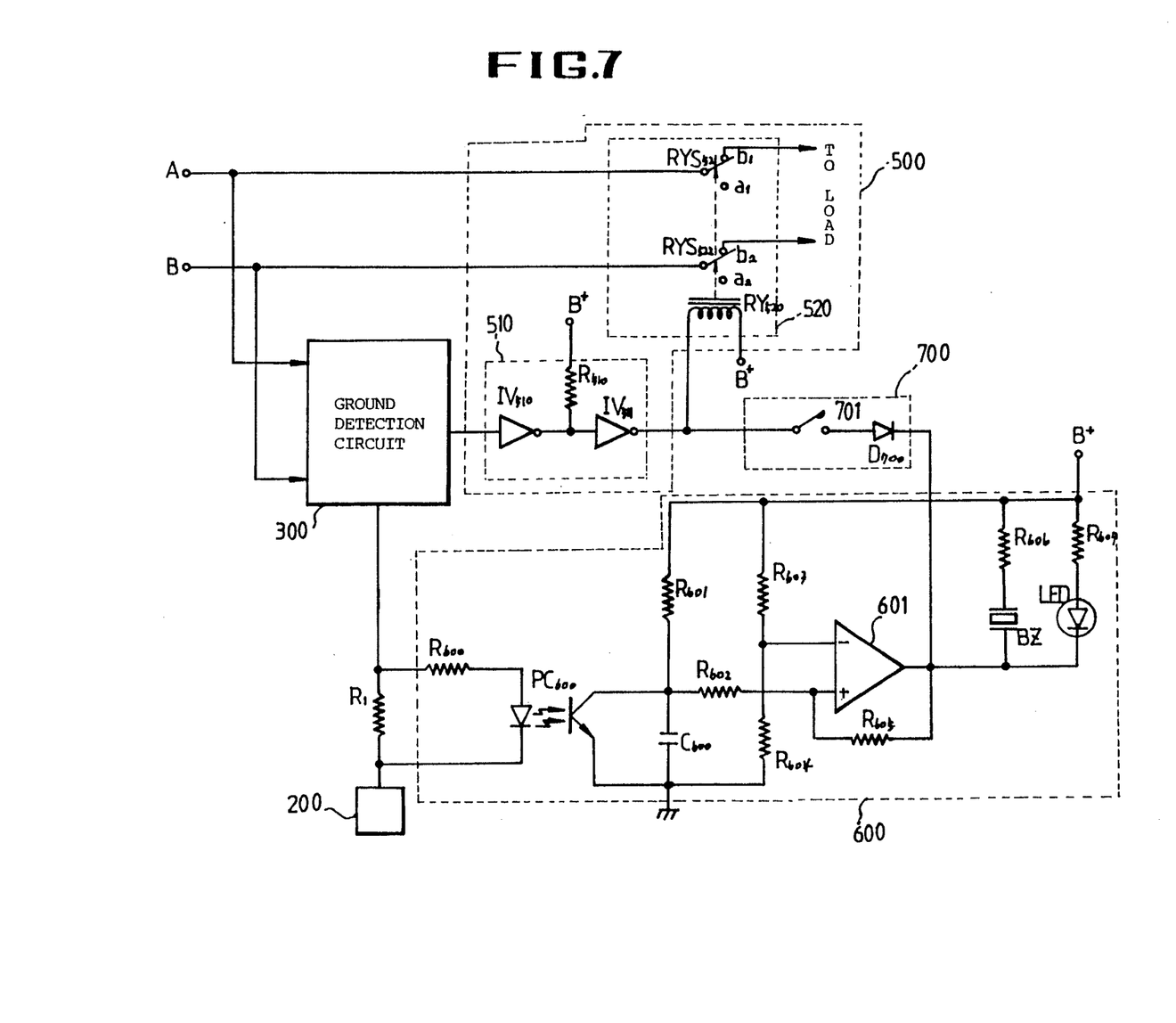
FIG. 7 is a circuit diagram depicting the leakage current detection circuit shown in FIG. 1.

Referring now to FIG. 7, there is shown a circuit diagram illustrating the AC power relay circuit, the leakage current detection circuit and the leakage current shielding control circuit of FIG. 2.

The AC power relay circuit 500 includes a shaping circuit 510 and a relay circuit 520. The shaping circuit 510 includes inverters IV510 and IV511. The input to the inverter IV510 is coupled to the collector of the transistor Q376 and its output is coupled to the input to the inverter IV511 which is coupled via resistor R510 to the DC operating power B.

The output from the inverter IV511 is coupled to the relay circuit 520 and the leakage current shielding control circuit 700. The relay circuit 520 includes a relay RY520 and switches RYS521 and RYS522. A terminal of the relay 520 is coupled to the output from the inverter 511 and the other terminal is coupled to the DC operating power B. When the relay RY520 is not activated, the AC power lines A and B are coupled via the switches RYS520 and RYS521 (contacts b1 and b2) to the AC load of the appliance.

The leakage current detection circuit 600 includes a photocoupler PC600, a comparator 601 and an alarm indication circuit 15. The photocoupler PC 600 serves to detect a voltage across the resistor R1 through a resistor R600. The non-inverting input of the comparator 601 is connected via resistors R601 and R602 and a capacitor C600 to the photocoupler PC600 while the inverting input thereof is coupled to a predetermined reference voltage source. The predetermined reference voltage may be determined by the voltage divider consisting of resistors R603 and R604. The output from the comparator is coupled via a feedback resistor 605 to the leakage current shielding control circuit 700 and the alarm indication circuit 15. The alarm indication circuit 15 includes a buzzer BZ and a photodiode LED. One terminal of the buzzer BZ is coupled to the output from the comparator 601 and the other terminal is coupled through a resistor 606 to the DC operating power B. In a same manner, one terminal of the photodiode LED is coupled to the comparator 601 and the other terminal is coupled via resistor 607 to the DC operating power B.

The leakage current shielding circuit 700 includes a diode D700 and a switch 701. The cathode of the diode D700 is coupled to the comparator 601 and the anode is coupled to one terminal of the switch 701. The other terminal of the switch 701 is coupled to the output from the inverter IV511.

Before the ground detection operation is completed, the ground detection circuit 300 generate a logic Low level signal to the AC power relay circuit 500. Thus, the relay RY520 is activated so that the AC power lines A and B are coupled to contacts a1 and a2, respectively and not coupled to the load.

When the ground detection operation is completed, the ground detection circuit 300 generates a logic high level signal to the AC power relay circuit 500. Therefore, the relay RY520 is not activated so that the AC power lanes A and B are coupled via the contacts b1 and b2 to the load.

On the other hand, while the AC power lines A and B are coupled to the load, the leakage current detection circuit 600 monitors the voltage across the resistor R1 in order to detect the leakage current. When the leakage current is generated, the voltage drop across the resistor R1 is increased. The increased voltage drop is coupled via the photocoupler PC600 to the capacitor C600 in which the increased voltage drop is inverted and coupled to the non-inverting input to the comparator 601. Since the inverted voltage drop is smaller than the predetermined reference voltage drop across the resistor R604, the comparator 601 generates a leakage current detection signal, i.e., a logic low level signal. The logic low level signal is then coupled to the diode D700, the buzzer BZ and the photodiode LED. The buzzer BZ and the photodiode LED serve to indicate to the user that the leakage current is generated. In that case, when the switch 701 is activated by the user, the relay RY520 is activated so that the AC power lines A and B are decoupled from the load.

As can be seen from the above, it is readily appreciated that, when the leakage current appears in the appliance, the load is effectively shielded from the power lines through the use of the leakage current detection circuit in accordance with the present invention. Further, the virtual ground of the appliance, e.g., case, is automatically coupled to the external ground by the ground detection circuit in accordance with the present invention.

While the present invention has been shown and described in connection with the preferred embodiments, it will be apparent to those of ordinary skill in the art that many changes and modifications may be made without departing from the spirit and scope of the invention as defined in the appended claims.

What is claimed is:

1. An apparatus for coupling a case of an electric appliance to an external ground, which comprises:
   neutral ground generating means for combining signals on first and second AC power lines to produce a neutral ground point;
   first detection means for detecting a current flow from the first AC power line to the case of the appliance to generate a first current detection signal;
   second detection means for detecting a current flow from the second AC power line to the case of the appliance to generate a second current detection signal; and
   ground coupling means for connecting, in response to the first current detection signal, the first AC power line as the external ground to the case of the appliance; for connecting, in response to the second current detection signal, the second AC power line as the external ground to the case of the appliance; and for connecting the neutral ground point as the external ground to the case of the appliance when the first and the second current detection signals are absent.

2. The apparatus as recited in claim 1, further comprising detection control means for sequentially generating a first drive signal for coupling the first detection means between the first AC power line and the case of the appliance, and a second drive signal for coupling the second detection means between the second AC power line and the case of the appliance, so that each of the first and the second drive signals are generated for a predetermined time interval.

3. The apparatus as recited in claim 2, wherein the first detection means includes a photocoupler for being coupled between the first AC power line and the case of the appliance, and the second detection means includes a photocoupler for being coupled between the second AC power line and the case of the appliance.

4. The apparatus as recited in claim 2, wherein each of the first and second detection means includes photocoupler for being coupled between one of the first and second AC lines and the case of the appliance, the photocoupler including a neon tube and a photoconductive element.

5. An apparatus for detecting a leakage current, for use in an electric appliance, which comprises:
   switching means for coupling a load of the appliance to first and second AC power lines;
   ground connection means for coupling a case of the electric appliance to one of the first and the second AC power lines as an external ground;
   current sensing means for being coupled between the case of the appliance and said one of the first and the second AC power lines, for detecting a current flowing between the case of the appliance and said one of the first and the second AC power lines to generate a current detection signal when the current is greater than a predetermined value; and
   switch drive means for generating, in response to the current detection signal, a switch drive signal to uncouple the first and the second AC lines from the load.

6. The apparatus as recited in claim 5, wherein the current sensing means includes a resistor for being coupled between the case of the appliance and said one of the first and the second AC power lines and a comparator for comparing a voltage drop across the resistor with a predetermined reference voltage to generate the current detection signal when the current is greater than the predetermined reference voltage.

7. An apparatus for coupling AC input to a load of an electric home appliance, which comprises:
   a ground connection circuit for coupling a case of the electric appliance to an external ground, comprising:
      neutral ground generating means for combining signals on first and second AC power lines to produce a neutral ground point;
      first detection means for detecting a current flow from the first AC power line to the case of the appliance to generate a first current detection signal;
      second detection means for detecting a current flow from the second AC power line to the case of the appliance to generate a second current detection signal; and
      ground coupling means for connecting, in response to the first current detection signal, the first AC power line as the external ground to the case of the appliance; for connecting, in response to the second current detection signal, the second AC power line as the external ground to the case of the appliance; and for connecting the neutral ground point as the external ground to the case of the appliance when the first and the second current detection signals are absent; and leakage current shielding means for detecting a leakage current, comprising:
   switching means for coupling a load of the appliance to the first and the second AC power lines;
   current sensing means for being coupled between the case of the appliance and one of the first and the second AC power lines which is connected to the case of the appliance as the external ground, for detecting a current flowing between the case of the appliance and said one of the first and the second AC power lines to generate a current detection signal when the current is greater than a predetermined value; and
   switch drive means for generating, in response to the current detection signal, a switch drive signal to uncouple the first and the second AC lines from the load.

8. The apparatus as recited in claim 7, further comprising detection control means for sequentially generating a first drive signal for coupling the first detection means between the first AC power line and the case of the appliance, and a second drive signal for coupling the second detection means between the second AC power line and the case of the appliance, so that each of the first and the second drive signals are generated for a predetermined time interval.

9. The apparatus as recited in claim 8, wherein the first detection means includes a photocoupler for being coupled between the first AC power line and the case of the appliance, and the second detection means includes a photocoupler for being coupled between the second AC power line and the case of the appliance.

10. The apparatus as recited in claim 8, wherein each of the first and second detection means includes photocoupler for being coupled between one of the first and second AC lines and the case of the appliance, the photocoupler including a neon tube and a photoconductive element.

11. The apparatus as recited in claim 10, wherein the current sensing means includes a resistor for being coupled between the case of the appliance and said one of the first and the second AC power lines and a comparator for comparing a voltage drop across the resistor with a predetermined reference voltage to generate the current detection signal when the current is greater than the predetermined reference voltage.

12. A method for coupling a case of an electric appliance to an external ground, the method comprising:

combining signals on first and second AC power lines to produce a neutral ground point;

detecting a current flow from the first AC power line to the case of the appliance to generate a first current detection signal;

detecting a current flow from the second AC power line to the case of the appliance to generate a second current detection signal;

in response to the first current detection signal, connecting the first AC power line as the external ground to the appliance case;

in response to the second current detection signal, connecting the second AC power line as the external ground to the appliance case; and when the first and second current detection signals are absent, connecting the neutral ground point as the external ground to the appliance case.

13. The method of claim 12 further comprising:

during a first predetermined time interval, generating a first drive signal to perform the step of detecting the current flow from the first AC power line to the case of the appliance; and during a second predetermined time interval following the first predetermined time interval, generating a second drive signal to perform the step of detecting the current flow from the second AC power line to the case of the appliance.

14. A method for detecting a leakage current, for use in an electric appliance, the method comprising:

coupling a load of the appliance to first and second AC power lines;

coupling a case of the appliance to one of the first and second AC power lines as an external ground;

with a current sensing means coupled between the case of the appliance and said one of the first and second AC power lines, detecting a current flowing between the case of the appliance and said one of the first and second AC power lines to generate a current detection signal when the current is greater than a predetermined value; and in response to the current detection signal, uncoupling the first and second AC power lines from the load.

* * * * *